Feb. 16, 1971 C. E. ENGLE 3,564,378
ACTIVE FEEDBACK NETWORK FOR ANALOGUE PLOTTER SERVO SYSTEM
Filed Aug. 8, 1969
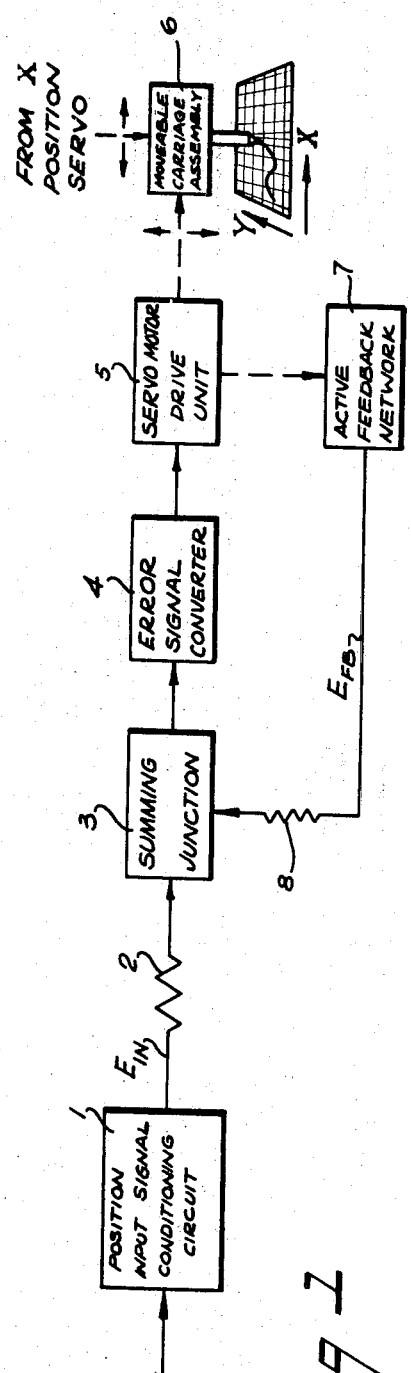
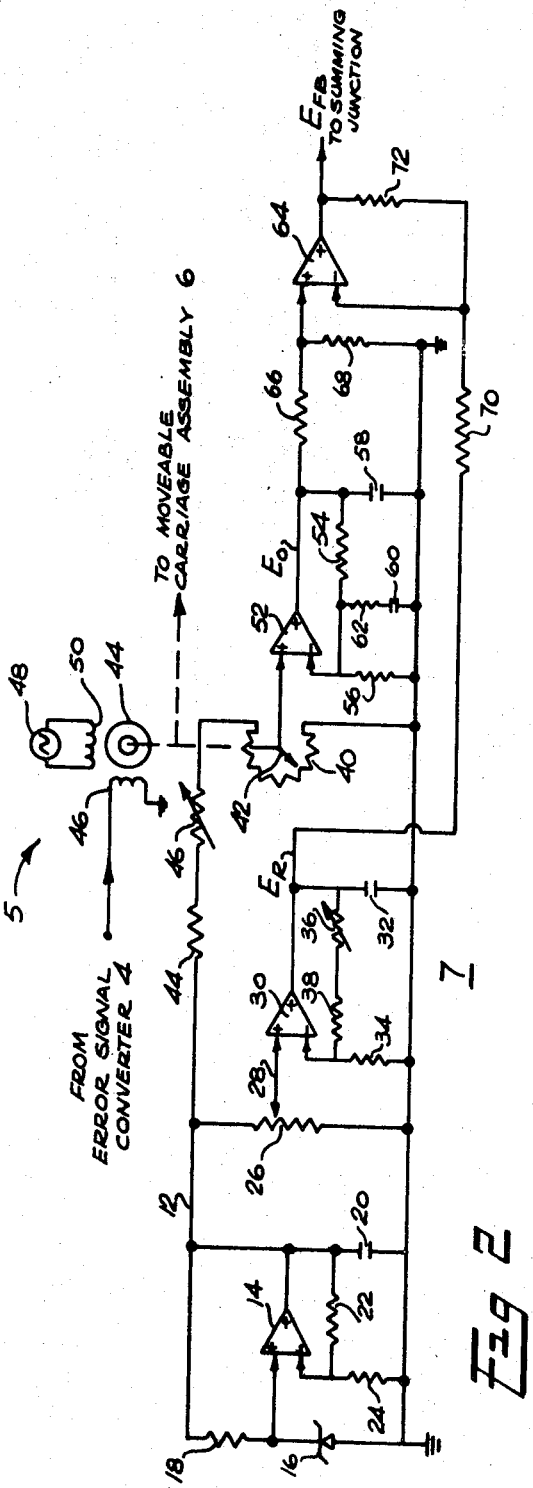
INVENTOR.
CHARLES E. ENGLE
BY
Nilsson & Robbins
Attorneys United States Patent Office 3,564,378
Patented Feb. 16, 1971

3,564,378
ACTIVE FEEDBACK NETWORK FOR ANALOGUE PLOTTER SERVO SYSTEM
Charles E. Engle, Tustin, Calif., assignor to Valtec Corporation, a corporation of California
Filed Aug. 8, 1969, Ser. No. 848,498
Int. Cl. G05b 5/01, 19/36
U.S. Cl. 318—576                                    6 Claims

ABSTRACT OF THE DISCLOSURE

A stable reference voltage is applied across both a follow-up and a zero reference potentiometer that have a movable tap coupled to supply a DC voltage to high impedance input of a respective operational amplifier. The gain of these operational amplifiers, as determined by the amount of negative feedback, is selected to produce steady state DC output voltages of the same magnitude for any given position setting along the selected coordinate axis. The negative feedback path for the operational amplifier coupled to receive the voltage from the tap on the follow-up potentiometer contains an RC delay network that provides a phase lead effect at its output for preventing overshoot. The operational amplifier output voltages are applied to opposite inputs of another operational amplifier coupled in a grounded resistance bridge arrangement to develop a feedback voltage for comparison at a summing junction with a position input signal to generate an error signal for driving the servo motor.

BACKGROUND OF THE INVENTION

(1) Field of the invention

This invention relates to servo positioning systems, and more particularly, to an active feedback network for a servo system used in controlling analogue graphical plotters and recorders.

(2) Description of the prior art

In analogue line plotters and graphical recorders, a separate servo system is provided for controlling the position of the marking stylus in a particular coordinate direction relative to a zero reference point on the recording medium, such as a graph paper or the like. Each servo positioning system responds to input position signals to drive a servo motor for moving the stylus towards a desired position in the particular coordinate direction. A feedback signal indicative of the displacement of the stylus from the zero reference position in the particular coordinate direction is compared with the input position signal to generate an error signal for driving the motor until the input and feedback signals match to indicate that the desired position has been reached.

To prevent overshooting of the desired position, a phase lead network is incorporated in the feedback path to increase the feedback signal, thereby decreasing the error signal during movement of the stylus by an amount proportional to the motor speed.

In prior systems of this type, as explained more fully in the inventor's co-pending application entitled "Servo System for Analogue Plotters" filed concurrently herewith, severe problems were encountered in achieving overall system accuracy and stability. These problems were primarily attributable to the existence of high frequency transients generated by movement of the follow-up potentiometer tap, and were particularly severe in systems operating with very low level input position signals. These high frequency transients, when differentiated through the phase lead network, could produce disproportionately large voltage variations in the error signal, since the DC component of the feedback voltage had to be severely attenuated to match the low level of the input signal. As pointed out in the aforementioned co-pending patent application, these problems may be eliminated by employing a direct current input amplifier to raise the level of the input signal for comparison in the summing junction with an unattenuated feedback signal, which is generated by an active feedback network having high impedance operation amplifiers coupled to the potentiometers to prevent potentiometer loading errors.

In such systems, a zero reference potentiometer is commonly employed to permit selection of a zero reference position for the stylus in each coordinate to give maximum plotting versatility. The origin point at the intersection of the coordinate axis can thus be shifted to accommodate various types of plots. In such systems, the feedback voltage generated by the follow-up potentiometer is compared with the selected zero reference voltage to produce a net feedback voltage signal indicative of the magnitude and sense of the stylus displacement along the particular coordinate axis from its selected zero position. In prior art systems of this type, the feedback and zero reference voltages were compared in a balanced bridge network to reject common mode signals, such as might result from reference voltage variations. Thus, the feedback voltage obtained from the bridge output would be indicative only of the difference between the applied feedback and zero reference voltages. To accomplish this, prior systems required floating bridge networks that prevented the error signal from being developed with reference to ground or common potential along with other portions of the network.

SUMMARY OF THE INVENTION

A fixed reference voltage source is connected across a conventional multiple turn wire wound potentiometer having a movable tap for selecting a zero reference, and also through a scaling resistance to maintain a smaller fixed reference potential across a one turn, non-wire wound follow-up potentiometer. The movable tap of the zero reference potentiometer is coupled to one input of a first operational amplifier while the movable tap of the follow-up potentiometer is coupled to the corresponding input of a second operational amplifier. These operational amplifiers each have a resistive negative feedback network coupling the output to the other input to establish the overall steady state gain of each amplifier in inverse proportion to the total reference voltage applied across the zero reference and follow-up potentiometers so that the output voltages of both amplifiers are developed on the same scale. A delay circuit coupled in the negative feedback network of the second operational amplifier provides the phase lead effect for the system feedback signal to prevent overshooting so that high frequency transients generated by movement of the follow-up potentiometer tap are not differentiated to result in high amplitude spikes in the feedback signal at the summing junction.

The zero reference voltage output from the first operational amplifier is compared with the output voltage from the second operational amplifier in a balanced bridge network that includes a third operational amplifier to generate the feedback signal for comparison with the input position signal to the system at the summing junction. One voltage is applied to a voltage divider having a pair of equal value resistors connected in series to ground potential with their common terminal coupled to one input of their operational amplifier. The other voltage is similarly applied through a pair of series connected voltage divider resistors having the same value to the output of the third operational amplifier with their common terminal coupled to the other amplifier input. In this way, the zero reference and feedback voltages are compared in the balanced bridge that not only achieves common mode rejection, but it is also coupled to ground or common potential with the other circuit components to eliminate the floating bridge operation necessary in prior art arrangements.

BRIEF DESCRIPTION OF THE DRAWING

FIG. 1 is a generalized block diagram generally illustrating the components of a servo system for an analogue graphical plotter or recorder employing an active feedback network in accordance with the invention; and FIG. 2 is a schematic circuit diagram of an active feedback network in accordance with the invention for use in the servo system of FIG. 1.

DESCRIPTION OF THE PREFERRED EMBODIMENT

Referring now to FIG. 1 which illustrates generally a servo system for an analogue graphical plotter or recorder with an active feedback network in accordance with this invention, a position input signal is applied to a position input signal conditioning circuit 1, which may include circuitry such as a digital-to-analogue converter for transforming the input signal into a DC voltage level indicative of the desired position in the selected coordinate direction, in this case the Y coordinate. The input signal is also amplified as necessary to an appropriate voltage level $E_{IN}$, preferably several volts or more at full scale, to be compared with a similarly scaled feedback voltage $E_{FB}$ in a summing junction 3 to generate an error signal. The error signal DC voltage from the summing junction 3 is applied to an error signal converter 4, typically including a modulator and amplifier that generates a driving signal capable of actuating a servo motor drive 5 mechanically coupled to position the movable carriage assembly on a plotter 6 in a selected coordinate direction. The servo motor drive 5 is also coupled through appropriate reduction gearing to an active feedback network 7 that generates the feedback signal $E_{FB}$ indicative of the stylus position to be applied through resistor 8 for comparison with the conditioned input voltage $E_{IN}$ at the summing junction 3. When the current to the summing junction 3 through resistor 2 that results from the feedback voltage $E_{FB}$ matches that through resistor 8 resulting from the input voltage $E_{IN}$ so that no error signal appears at the summing junction 3, the stylus has then reached the desired position and the servo motor drive unit 5 stops.

The foregoing brief description of the overall servo system operation has been included to assist in the understanding of the improved operation and particular active feedback network in accordance with this invention, as hereinafter described in connection with FIG. 2. A more detailed description of one particular form of such a servo system may be had by reference to the aforementioned co-pending patent application filed concurrently herewith.

Referring now to FIG. 2, a fixed reference voltage is established between a common or ground connection 10 and the line 12. This reference voltage may be supplied from an external regulated source (not shown) or from an internal voltage regulator such as that shown herein employing an operational amplifier 14. In this arrangement, a Zener diode 16 connected in the reverse direction with its anode at ground potential establishes a fixed positive voltage at the positive input terminal of the operational amplifier 14, which has its positive output connected to the reference voltage line 12 and through dropping resistor 18 back to the positive input terminal. The positive amplifier output is also coupled to ground potential through a small smoothing capacitor 20 and through a voltage divider consisting of resistors 22 and 24 in series to supply negative feedback to the negative amplifier input from the common terminal between the resistors 22 and 24 to maintain the circuit gain at the appropriate level for supplying the desired reference voltage on the line 12.

The reference voltage established between the line 12 and ground 10 is supplied across a conventional wire wound potentiometer 26 that has a movable tap 28 for establishing a zero reference voltage level for positioning the plotter stylus at a desired zero axis point on the recording medium in the absence of the input position signal. The zero reference voltage on the tap 28 is coupled directly to the positive input terminal of an operational amplifier 30 that has a very high input impedance which eliminates potentiometer loading inaccuracies. The positive output of the operational amplifier 30 is likewise coupled through a small smoothing capacitor 32 to ground 10 and also through a variable voltage divider to provide negative feedback at the negative input terminal of amplifier 30. A fixed resistor 34 coupled between ground and the negative amplifier input forms one leg of the divider, while a variable resistor 36 and a fixed resistor 38 coupled in series between the amplifier output and negative input forms the other divider leg. The variable resistor 36 is adjustable to vary overall amplifier gain. For any single plotting operation the potentiometer tap 28 and the variable resistor 36 are maintained at constant settings to produce a zero reference voltage $E_R$ that positions the marking stylus at the selected zero coordinate reference positions on the recording medium.

A follow-up potentiometer 40, preferably of the single turn, non-wire wound type, has its movable tap 42 rotated by mechanical coupling to the output shaft of a servo motor 44, preferably as shown here, of the conventional two phase induction type that receives the modulated error signal on one of its phase windings 46 in phase quadrature with the alternating current supplied from a source 48 through its other phase winding 50. The motor output shaft is also coupled to drive the carriage assembly for the stylus. Appropriate speed ratios for driving the stylus and potentiometer are achieved through gearing or other suitable means. Since the single turn follow-up potentiometer 40 generally operates at a lower rated voltage than the conventional wire wound potentiometer 26, the reference voltage supplied on line 12 is reduced to a desired fixed lower level by being applied through the series connected fixed resistor 44 and a variable resistor 46 to one end of the single turn potentiometer 40 with the other end at ground potential.

The output voltage from the follow-up potentiometer 42 is coupled directly to the positive input of an operational amplifier 52 so that its high input impedance eliminates potentiometer loading error. As with the other operational amplifier arrangements, a negative feedback path is provided from the positive output through a feedback resistor 54 connected in series with a resistor 56 to ground 10 to form a voltage divider. The positive amplifier output is, as with the other amplifiers, coupled through a small smoothing capacitor 58 to ground potential. The negative feedback path for the operational amplifier 52 also includes a delay circuit consisting of a relatively large capacitor 60 coupled in series with a small resistor 62 between the negative amplifier input and ground 10. This delay circuit retards changes in the negative feedback voltage resulting from changes in the amplifier output voltage $E_O$ thus providing a phase lead effect at the amplifier output.

To illustrate, assume that there is a sudden positive increase in the output voltage developed on the follow-up potentiometer tap 42 which is amplified to produce a larger sudden increase in the output voltage $E_O$. Initially a charging current would flow through the caapcitor 60 and the resistor 62, and the impedance between the negative amplifier input and ground potential would be significantly less than the resistance value of the voltage divider resistor 56 because of the low impedance current path through capacitor 60 and resistor 62. Accordingly, the negative feedback voltage applied to the negative input terminal would be delayed in reaching its steady-state maximum level until the capacitor 60 has been fully charged to the new voltage level. This delay of the negative feedback in response to changes in the output voltage thus requires the amplifier 52 to produce a greater than normal output voltage change to maintain the potentiometric balance required between its positive and negative inputs, thereby producing the phase lead effect. This unique arrangement eliminates the requirement for the conventional phase lead network with a resistor and capacitor in parallel in the output voltage path wherein the capacitor provided a low impedance path for high frequency transients to appear as outsized voltage spikes at the summing junction in the system.

The zero reference voltage output $E_R$ from the operational amplifier 30 and the feedback output voltage $E_O$ from the operational amplifier 52 are compared in a balanced bridge arrangement to produce a net feedback signal voltage $E_F$ to be applied to the summing junction of the system for comparison with the position input signal to generate an error signal. This balanced bridge arrangement employs an operational amplifier 64 to develop a feedback voltage with respect to ground potential, thus avoiding the prior difficulties of floating bridges. Both voltages $E_O$ and $E_R$ are developed on equal voltage scales by proper proportioning of the gain of the respective operational amplifiers 52 and 30 as determined by the amount of negative feedback provided by their voltage divider resistors. In other words, the portion of the output voltage $E_O$ from the operational amplifier 52 that is fed back under steady-state conditions is determined by the value of the resistor 54 relative to that of the resistor 56, whereas the portion of the output voltage $E_R$ from the operational amplifier 30 that is fed back depends upon the combined value of the resistances 36 and 38 as compared to that of the resistor 34. The relative resistance values are selected to provide the gain required in each case for maintaining the $E_O$ and $E_R$ voltage on the same scale. Variable resistor 38 in the feedback path of the differential amplifier 30 permits fine adjustment of the gain. With the amplifier gains properly balanced, the amplitude of the voltages $E_O$ and $E_R$ would be the same for any given coordinate position of the stylus. This matching of the output voltage scales simplifies comparison of the voltages in the balanced bridge arrangement.

In the balanced bridge, the voltage $E_O$ from the output of the operational amplifier 52 is developed across the resistors 66 and 68 connected in series between the amplifier output and ground potential with the common terminal between them connected directly to the positive input of the operational amplifier 64. The zero reference potential voltage $E_R$ is applied through the resistors 70 and 72 connected in series to the positive output of the operational amplifier 64. In this arrangement, with the voltages $E_R$ and $E_O$ developed on the same scale, each of the bridge resistors 66, 68, 70 and 72 would have the same resistance value, typically 10,000 ohms each. And each would constitute a leg of the balanced bridge network. The operational amplifiers 64 operate in potentiometric fashion to provide a feedback voltage $E_F$ on its positive output that maintains the potentials at its positive and negative inputs equal. Since the voltage at the positive input of the operational amplifier 64 equals half of the output voltage $E_O$, and the voltage at the negative amplifier input equal half of the difference between the zero reference and feedback voltages $E_R$ and $E_F$, the feedback voltage $E_F$ must then equal the difference between the voltages $E_O$ and $E_R$ if the positive and negative inputs to the operational amplifier are to be the same.

The fact that the bridge resistor 68 is connected to ground potential 10 permits operation as a grounded balanced bridge to achieve common mode rejection, while at the same time eliminating difficulties involved in the floating bridge arrangements of the prior art. Also, the operational amplifiers 30 and 52 not only eliminate potentiometers loading with their high input impedances, but provide a buffering effect that allows the zero reference and output voltages developed by the potentiometers to be applied to the relatively low input impedance of the balanced bridge network.

What is claimed is:

1. In a servo system for positioning marking means relative to a recording medium in an analogue plotter in response to an input signal voltage wherein said system includes summing junction means for comparing a feedback voltage with said input signal voltage to generate an error signal for driving a servo motor to move said marking means relative to a selectable zero axis position along a given coordinate direction comprising:

zero reference potentiometer means having a movable output tap thereon for selectively providing a first voltage indicative of said zero axis position of said coordinate;

first operational amplifier means having opposite polarity input terminals each having a high input impedance many times greater than the impedance of said variable potentiometer means, and having an output with relatively low impedance, said output tap being directly coupled to one of said input terminals and said amplifier output being coupled to a first voltage divider to provide a negative feedback to the other of said input terminals;

follow-up potentiometer means having a second movable output tap coupled to be driven with said stylus by said servo motor to generate a voltage indicative of the instantaneous position of said stylus on said recording medium;

second operational amplifier means having opposite polarity inputs each with an input impedance many times greater than that of said follow-up potentiometer means and an output coupled through a second voltage divider to supply a negative feedback signal to its other input;

delay means coupled to the voltage divider of said second operational amplifier for delaying the negative feedback signal at its other input in response to changes in the voltage at the output for generating an output voltage during movement of said tap that leads in phase the voltage variations appearing at said movable tap; and a balanced bridge arrangement for comparing the output voltage levels of said first and second operational amplifiers to generate a feedback signal having an amplitude and polarity indicative of the displacement of said stylus from the selected zero position along the coordinate.

2. The active feedback network of claim 1 wherein both of said zero reference and follow-up potentiometer means and said voltage divider networks are connected to a common potential; and said balanced bridge network includes first and second bridge resistors connected in series between the output of said second operational amplifier and said common potential, a third operational amplifier having opposite polarity inputs with one of said inputs being connected to a common terminal between said first and second bridge resistors, and third and fourth bridge resistors coupled in series between the output of said first operational amplifier and the output of said third operational amplifier with their common terminal coupled to the other of said opposite polarity inputs to apply a negative feedback voltage corresponding to a voltage intermediate the output voltages from said first and third operational amplifiers, whereby the output voltage of said third operational amplifier is directly proportional to the difference between the output voltages from said first and second operational amplifiers and constitutes said feedback voltage.

3. The active feedback network of claim 2 wherein the voltage at the outputs of said first and second operational amplifiers are developed on the same scale to have the same values for indicating each position of said marking means; and said first, second, third and fourth bridge resistors have equal resistance values.

4. In a servo system for controlling the position of a load means relative to a zero position along a selected coordinate direction, an active feedback network comprising:

first circuit means including a first potentiometer and first operational amplifier with a high input impedance coupled to the potentiometer output for developing a zero reference voltage on a given scale with respect to a common ground potential indicative of a zero reference position;

second circuit means including a second potentiometer and a second operational amplifier with a high input impedance coupled to receive the second potentiometer output for generating a feedback voltage with respect to said ground potential proportional to the position and speed of movement of said stylus relative to said recording medium in said given coordinate direction; and a balanced bridge arrangement including a third operational amplifier having opposite polarity inputs and an output, and having bridge resistors of substantially equal value with two of said resistors being connected in series at a first common terminal to form a first voltage divider network and with the other of two resistors being connected in series at a second common terminal to form a second voltage divider network with said first and second common terminals being coupled to respective one of the opposite polarity inputs of said third operational amplifier, said first voltage divider network being coupled between the output of said operational amplifier and ground potential and said second voltage divider being coupled between the output of said first operational amplifier and the output of said third operational amplifier, whereby said third operational amplifier generates a feedback signal voltage at its output indicative of the displacements of said load means from said zero reference position along said given coordinate.

5. The active feedback circuit of claim 4 wherein said second operational amplifier includes a negative feedback network having delay means for coupling the output of said second operational amplifier to its opposite polarity input to generate a feedback signal voltage with respect to ground potential that leads in phase the voltage variation from said second potentiometer.

6. The active feedback circuit of claim 5 wherein said first and second operational amplifiers each include a voltage divider feedback network consisting of first and second resistive elements connected in series between the output and ground potential with the common terminal between said resistive elements being coupled to the opposite polarity input terminal and with the output of the respective potentiometer being coupled to the other input terminal, and with the resistive elements in each voltage divider network being proportioned in accordance with that of the other to provide an amount of negative feedback determinative of the steady state gain of said first and second operational amplifiers to produce said zero reference and feedback voltages on the same voltage scale.

References Cited

UNITED STATES PATENTS 3,398,341   8/1968   Dooley et al. _____ 318—28X
3,465,276   9/1969   Silva et al. _____ 318—18X BENJAMIN DOBECK, Primary Examiner U.S. Cl. X.R.

318—28